United States Patent [19]

Inoue et al.

[11] Patent Number: 5,676,614

[45] Date of Patent: Oct. 14, 1997

[54] CHAIN TENSIONER DEVICE

[76] Inventors: Kozo Inoue, 1179-10-210, Hanno, Hanno-shi Saitama-ken; Hiroshi Hashimoto, C-305, 53-2, Keyakidai 1-chome, Tokorozawa-shi Saitama-ken, both of Japan

[21] Appl. No.: 736,828

[22] Filed: Oct. 28, 1996

[30] Foreign Application Priority Data

Oct. 27, 1995 [JP] Japan ................... 7-280655

[51] Int. Cl.$^6$ .................................................. F16H 7/08
[52] U.S. Cl. ........................... 474/110; 474/111; 474/138; 474/140
[58] Field of Search ................................ 474/110, 111, 474/138, 140

[56] References Cited

U.S. PATENT DOCUMENTS

| 4,457,741 | 7/1984 | Hoeptner | 474/138 |
|---|---|---|---|
| 4,726,801 | 2/1988 | Stark | 474/138 X |
| 4,969,859 | 11/1990 | Holbrook | 474/138 |
| 4,976,661 | 12/1990 | Ojima | 474/138 |
| 4,983,144 | 1/1991 | Ojima | 474/138 X |
| 5,004,448 | 4/1991 | Ojima | 474/138 X |
| 5,004,449 | 4/1991 | Ojima | 474/138 |
| 5,035,680 | 7/1991 | Ojima | 474/138 |
| 5,055,089 | 10/1991 | Ojima | 474/138 |
| 5,073,158 | 12/1991 | Ojima | 474/138 |
| 5,167,402 | 12/1992 | Nakakubo et al. | 267/226 |
| 5,234,383 | 8/1993 | Harada et al. | 474/138 X |

*Primary Examiner*—Roger J. Schoeppel
*Attorney, Agent, or Firm*—Dann, Dorfman, Herrell and Skillman; Henry H. Skillman

[57] ABSTRACT

An improved chain tensioner device having a small outside shape or profile and a relatively small number of components which can be assembled with a small number of steps. A tensioner body 2 slidably mounts a plunger 4 which carries a shoe 7 for engaging the chain. The shoe 7 has an extension strip 12 formed integrally therewith and extending over a guide surface 11 on the body 2 for preventing the shoe 7 from rotating about the axis of the plunger 4. A pin locking hole 13 is formed in the guide surface 11 and the extension strip 12 has a pin receiving through-hole 14 formed at a position which can be aligned with the pin locking hole 13. A stopper pin 15 is fitted through the pin receiving through-hole 14 into the pin locking hole 13, thereby locking the shoe 7 in position against movement relative to the tensioner body 2 during installation.

7 Claims, 3 Drawing Sheets

CHAIN TENSIONER DEVICE

FIELD OF THE INVENTION

The present invention relates to a chain tensioner device for applying a tension to a chain used for undertaking timed driving of camshafts of an automobile engine, and more particularly to a chain tensioner device having a structure by means of which a shoe slidably engageable with the chain is attached to a tensioner body.

BACKGROUND OF THE INVENTION

A conventional chain tensioner device used for transmitting a power between a crankshaft and camshafts of an engine via timing chains includes, as shown in FIG. 6, a plunger 22 urged by a spring 21 to project outwardly from a tensioner body 1. The plunger 22 has an upper end fitted with a plate base 23 to which is secured a shoe 25 slidably engageable with a chain 24 to apply a tension to the chain 24. In order to prevent the plunger shoe 25 from rotating about the sliding axis of the plunger 22, and to allow the plunger to be temporarily locked against sliding movement during installation or maintenance, the tensioner body 20 includes a plate 26 attached thereto by a rivet 27. The plate 26 is formed with a pin receiving through-hole 28. The shoe 26 has in its side surface a pin locking hole 29 which can be aligned with the pin receiving through-hole 28 when the plunger 22 is forced or retracted into the tensioner body 20.

When the chain tensioner device is to be installed on the engine, the plunger 22 is forced into the tensioner body 1 until the pin receiving through-hole 28 is aligned with the pin locking hole 29, and after that a stopper pin 30 is inserted from a lateral direction into the aligned two holes 28, 29, thereby securing the shoe to the tensioner body.

The conventional chain tensioner device of the foregoing construction has a problem that it requires a large number of components because the plate for securing the shoe is riveted to the side surface of the tensioner body; and due to the operations required to secure the plate to the tensioner body, the number of manufacturing and assembling steps is increased. Another problem is that since a side surface of the plate prevents rotation of the shoe, the plate necessarily projects upwardly beyond an upper surface of the shoe, increasing the outside shape or profile of the chain tensioner device.

SUMMARY OF THE INVENTION

It is, therefore, an object of this invention to provide a chain tensioner device which is composed of a relatively small number of components, is able to reduce the number of assembling steps, and has a relatively small or compact outside shape or profile.

To attain the foregoing object, an improved chain tensioner device according to the present invention includes a plunger having an upper end to which a shoe is attached via a plate base for sliding contact with a chain, and a tensioner body in which the plunger is slidably fitted with its upper end portion projecting outwardly from the tensioner body by the action of an urging means, wherein the improvement comprises: the tensioner body having, on its one side, a guide surface parallel to the direction of sliding movement of the plunger, and a pin locking hole formed in the guide surface; the shoe having an extension strip formed integrally therewith and extending over the guide surface to prevent the shoe from rotating about an axis of the plunger, the extension strip having a pin receiving throughhole located at a position which can be aligned with the pin locking hole; and a stopper pin fitted through the pin receiving through-hole into the pin locking hole to lock the shoe in position against movement relative to the tensioner body.

It is preferable that the shoe is configured such that at least a surface of the plate base facing toward the tensioner body is covered by the shoe to avoid direct contact between the plate base and the tensioner body.

BRIEF DESCRIPTION OF THE DRAWINGS

The foregoing summary, as well as the following detailed description of the preferred embodiments of the present invention, will be better understood when read in conjunction with the appended drawings, in which.

DETAILED DESCRIPTION OF THE PREFERRED EMBODIMENTS

Figure 1:
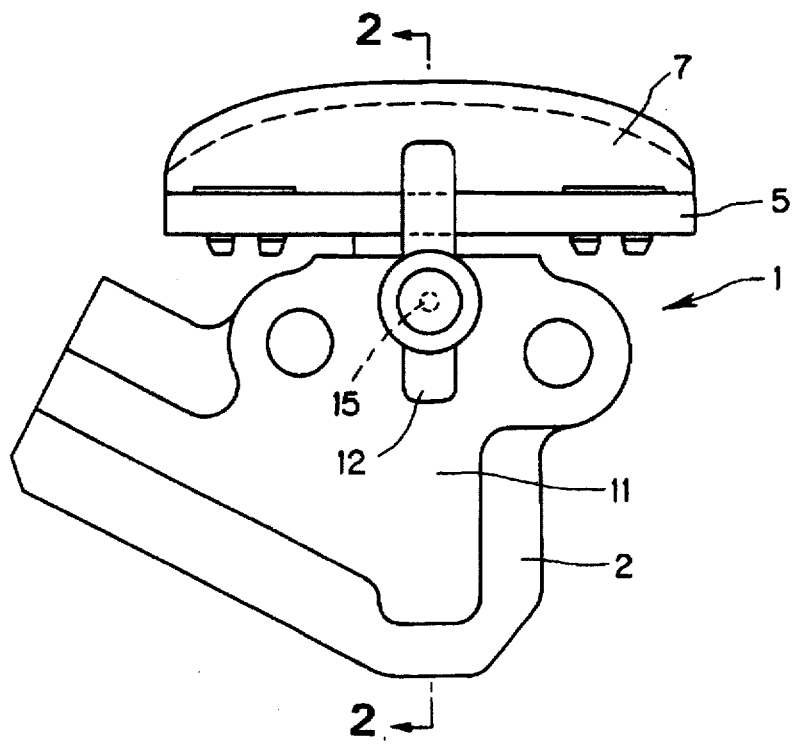
FIG. 1 is a side view showing one embodiment of a chain tensioner device according to the present invention.
Figure 2:
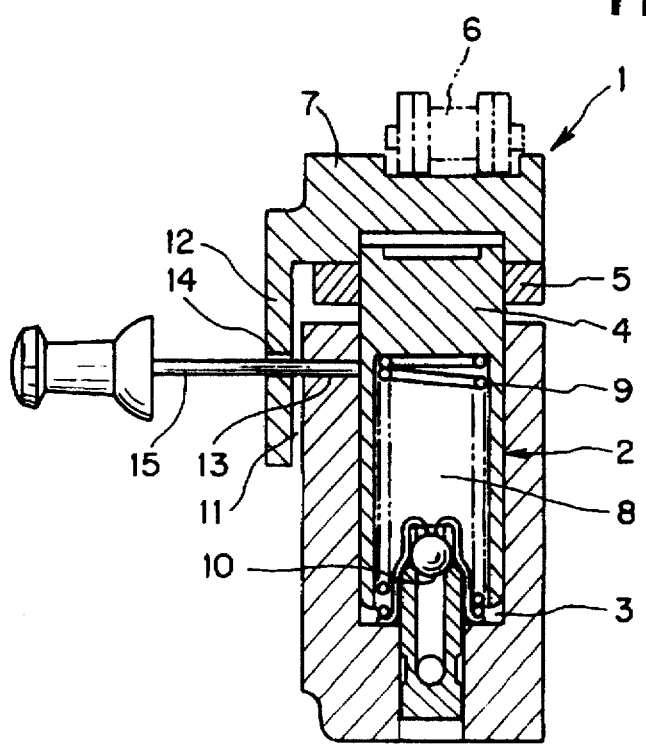
FIG. 2 is a cross-sectional view taken along the line 2—2 of FIG. 1.

Certain preferred embodiments of the present invention will be described below with reference to the drawings. A first embodiment of a chain tensioner device according to the present invention is shown in FIGS. 1 and 2. The chain tensioner device 1 includes a tensioner body 2 adapted to be attached to an engine side and having a cylindrical chamber 3, a plunger 4 slidably fitted in the cylindrical chamber 3 for sliding longitudinal movement along the central axis of the plunger, a plate base 5 fitted with an upper end portion of the plunger 4, and a shoe 7 secured to the plate base 5 for sliding contact with a chain 6 to exert a tension on the chain 6.

The plunger 4 has an internal hollow portion 8 formed therein with its lower end open. The hollow portion 8 receives therein a spring 9 provided as an urging means for urging the plunger 4 upwardly along its axis to force the shoe 7 against the chain 6. A check valve 10 is disposed at the bottom of the cylindrical chamber 3 in opposed relation to the hollow portion 8 providing unidirectional flow for introducing an oil into the hollow portion 8 while preventing the reverse flow of the oil. The hollow portion 8 is always filled with the oil supplied from its lower side via the check valve 10, so that when the plunger 4 is forced into the cylindrical chamber 3 by an impact force applied from the chain 6 to the shoe 7, the oil pressure in the hollow portion 8 increases, thereby closing the check valve 10.

The oil in the hollow portion 8, which is prevented from flowing out through the check valve 10, flows out from a lower end of the plunger in an upward direction through a limited clearance between the outside surface of the plunger 4 and the inside surface of the cylindrical chamber 3 and is discharged to the outside of the chain tensioner device 1. In this instance, the oil, as it passes through the clearance, is subjected to a flow resistance by means of which the impact energy is absorbed. Thus, a desired shock absorbing effect can be attained.

The tensioner body 2 has on its one side a guide surface 11 extending parallel to the axis of the plunger 4. On the other hand, the shoe 7 has an extension strip 12 formed integrally therewith and extending downwardly from one side of the shoe 7 and has an extension surface confronting the guide surface 11. Because of the extension strip 12 closely confronting the guide surface 11, rotation of the shoe 7 about an axis of the plunger 4 is prevented. The guide surface 11 has a pin locking hole 13, and the extension strip 12 which is guided by the guide surface 11 has a pin receiving through-hole 14 formed such that the pin receiving through-hole 14 can be aligned with the pin locking hole 13 when the plunger 4 is retracted in the cylindrical chamber 3.

While the pin locking hole 13 and the pin receiving through-hole 14 are kept in their aligned position, a stopper pin 15 is inserted into the pin receiving through-hole 14 from the outside of the extension strip 12 and then it is further advanced through the pin receiving through-hole 14 into the locking hole 14, so that the shoe 7 is locked in position against displacement relative to the tensioner body 2.

Figure 3:
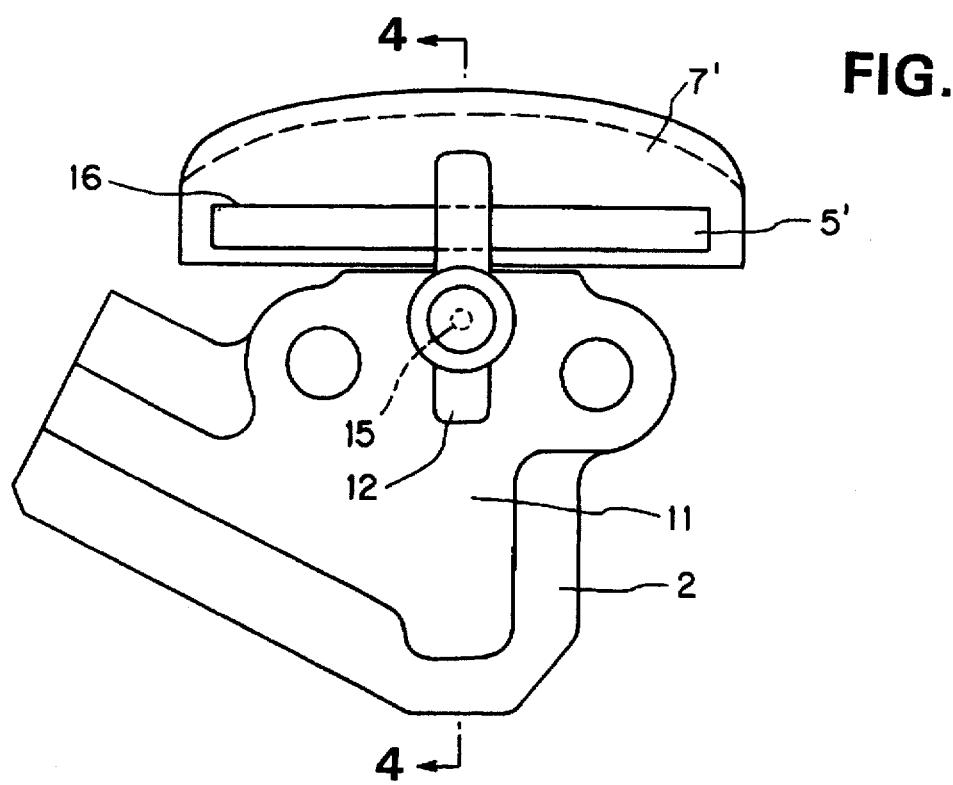
FIG. 3 is a side view showing another embodiment of the chain tensioner device according to the present invention.
Figure 4:
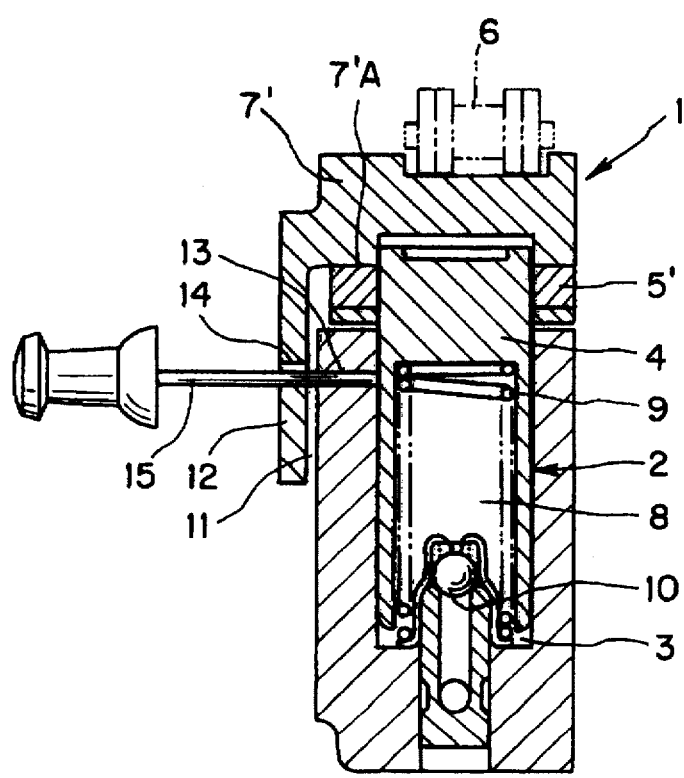
FIG. 4 is a cross-sectional view taken along the line 4—4 of FIG. 3.
Figure 5:
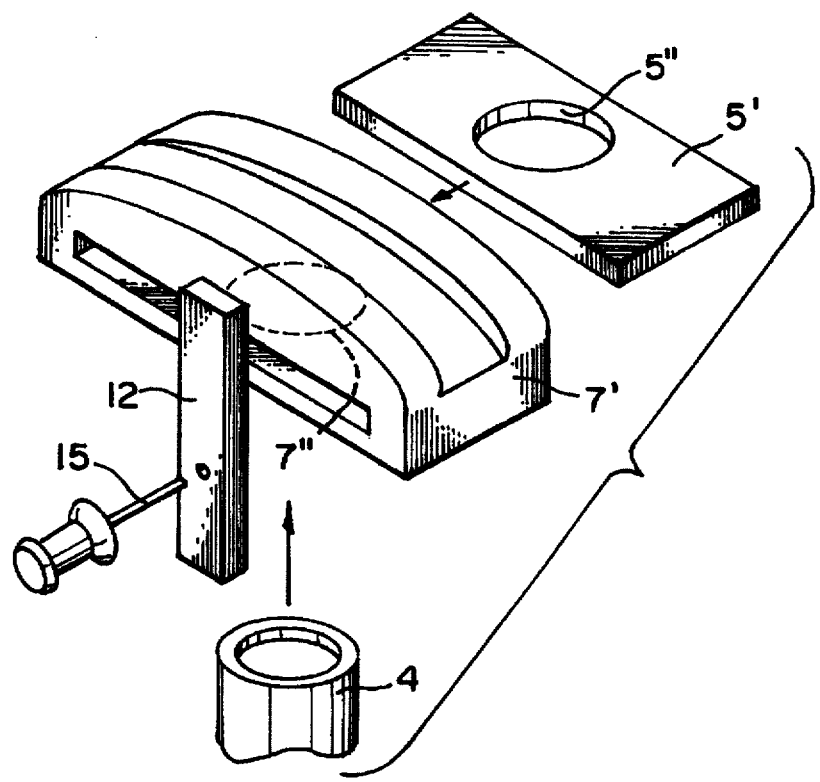
FIG. 5 is a perspective view showing the relationship between a shoe and a plate base.
Figure 6:
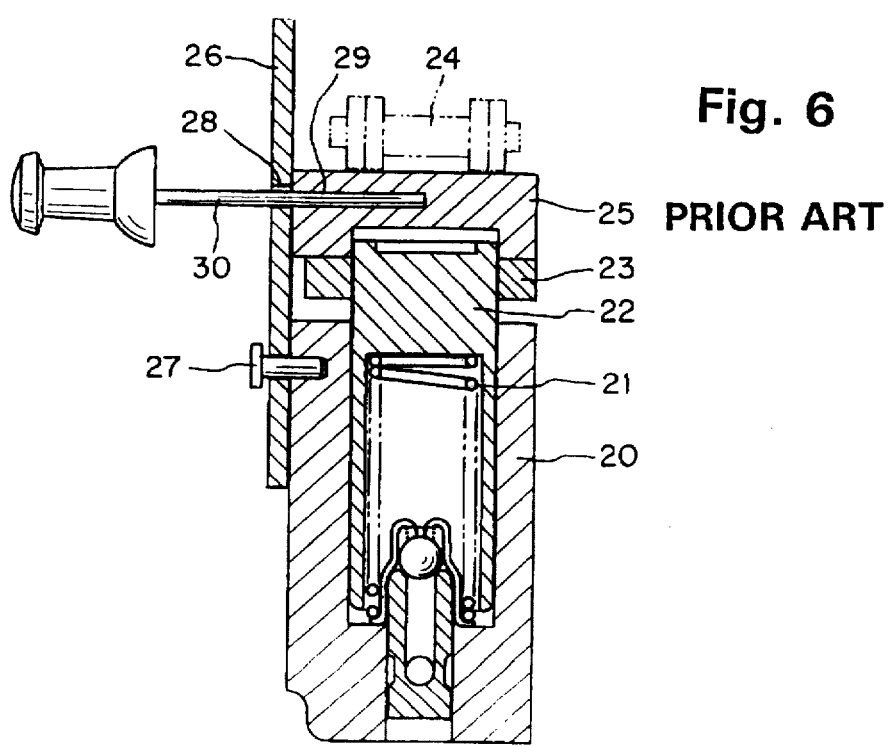
FIG. 6 is a cross-sectional view showing one example of conventional prior art chain tensioner devices.

FIGS. 3, 4 and 5 show another embodiment of the chain tensioner device according to the present invention in which equivalent parts are designated by the same reference characters as those shown in FIGS. 1 and 2. Parts which have the same structure as shown in the first embodiment employ reference characters without a prime designation, and parts which are different are identified by primed referenced characters.

In this embodiment, a plate base 5' is fitted in a rectangular recess or hole 16 formed in a shoe 7' and then, an upper end portion of the plunger 4 is press-fitted into a hole 5" formed in the plate base 5' through a loose-hole 7" of the shoe 7, as shown in FIGS. 3 and 5, so that a surface of the plate base 5' which faces toward the tensioner body 2 side is covered with a portion of the shoe 7'. Since the lower side of the plate base 5' is covered by the shoe 7', when the plunger 4 is forced into the cylindrical chamber 3, the upper surface of the tensioner body 2 and the lower surface of the plate base 5' are held out of direct striking contact with each other, and the shoe 7' which has the effect of absorbing an impact force is brought into abutment with the upper surface of the tensioner body 2.

According to this embodiment, the plate base 5' fitted in the rectangular recess or hole 16 formed in the shoe 7' is surrounded by the shoe 7'. It is, however, possible to use a shoe so configured as to allow the undersurface of the shoe to cover only a surface of the base plate confronting the tensioner body in order to preclude direct contact between the plate base and the tensioner body.

As described above, according to the present invention, the prior art plate which is attached, as a separate part or component, to the tensioner body of the conventional chain tensioner can be omitted and, hence, a total number of components can be reduced. In addition, since the assembling operation does not include a step of attaching the plate to the tensioner body by means of a rivet or the like, the number of assembling steps can be reduced, which will increase the working efficiency and lower the manufacturing cost.

Furthermore, since the extension strip 12 formed integrally with the shoe is used as a guide for the retracting movement of the plunger to prevent rotational movement of the shoe about the axis of the plunger, there is no part or component projecting upwardly from the shoe. Thus, the outside shape or profile of the chain tensioner device is reduced.

According to one preferred form of this invention, the shoe is so configured as to cover at least the surface of the plate base which confronts the tensioner body in order to preclude direct contact between the plate base and the tensioner body. The upper surface of the tensioner body and the lower surface of the plate base are, therefore, held out of direct striking contact with each other. Instead, the shoe which has the effect of absorbing an impact force is brought into abutment with the upper surface of the tensioner body. With this arrangement, the durability of the chain tensioner device can be improved.

In use of the chain tensioner device of this invention when the device is installed on an engine, the plunger is forced into the tensioner body while keeping the extension strip 12 of the shoe in sliding contact with the guide surface 11. When the pin receiving through-hole 14 is in alignment with the pin locking hole 13, the stopper pin 15 is fitted into the aligned holes, thereby locking the shoe in position against movement relative to the tensioner body. While keeping this locked condition, the chain tensioner device is attached to the engine. In this instance, since rotation of the shoe about the axis of the plunger does not take place due to abutting engagement between the extension strip 12 and the guide surface 11 of the tensioner body, the shoe 7 can be aligned with the chain 6 without an adjustment or orientation, This enables the installation to be completed without applying tension to the chain. Upon completion of installation, the stopper pin is removed. The shoe and the plunger are, therefore, released from being locked, and the plunger is projected outwardly from the tensioner body by the force of the urging means to force the shoe against the timing chain, thereby exerting a tension on the timing chain. A stop (not shown) prevents the plunger from completely disengaging the body.

In the case where the shoe 7' is so configured as to cover all or part of the surface of the plate base 5' confronting the tensioner body in order to preclude direct contact between the plate base and the tensioner body, even when the plunger is forced into the tensioner body to a greater extent, a desired shock-absorbing effect can be attained because the shoe is of a material having the effect of absorbing an impact force brought by striking contact with the tensioner body.

While particular embodiments of the invention have been herein illustrated and described, it is not intended to limit the invention to such disclosures, but changes and modifications may be made therein and thereto within the scope of the following claims.

We claim:

1. A chain tensioner device including a plunger having an upper end portion with a plate base, a shoe attached to said plate base for sliding contact with a chain, and a tensioner body in which said plunger is slidably fitted, said upper end portion projecting from said tensioner body, and an urging means for urging said end portion outwardly from said body, the improvement comprising:

said tensioner body having, on its one side, a guide surface parallel to the direction of sliding movement of said plunger, and a pin locking hole formed in said guide surface;

said shoe having an extension strip formed integrally therewith and extending over said guide surface to prevent said shoe from rotating about an axis of said plunger, said extension strip having a pin receiving through-hole located at a position which can be aligned with said pin locking hole; and a stopper pin fitted through said pin receiving through-hole into said pin locking hole to lock said shoe in position against movement relative to said tensioner body.

2. A chain tensioner device according to claim 1, wherein said shoe is configured such that at least a surface of said plate base facing toward said tensioner body is covered by said shoe to avoid direct contact between said plate base and said tensioner body.

3. A chain tensioner device including a plunger having an upper end portion with a plate base, a shoe attached to said plate base for sliding contact with a chain, a tensioner body slidably mounting said plunger for movement along an axis with its upper end portion projecting from said tensioner body, and an urging means for urging said end portion outwardly from said body, said tensioner body having one side with a guide surface parallel to the axis of sliding movement of said plunger, and a pin locking hole formed in said guide surface, said shoe having an extension strip formed integrally therewith and having an extension surface confronting said guide surface to prevent said shoe from rotating about said axis, said extension strip having a pin receiving throughhole located at a position which can be aligned with said pin locking hole; and a stopper pin adapted to be fitted through said pin receiving through-hole into said pin locking hole to lock said shoe in position against movement relative to said tensioner body.

4. A chain tensioner device according to claim 3, wherein each of said shoe and said plate base has an inner surface facing toward said tensioner body, said shoe having a recess, and said plate base being mounted in said recess so that the plate base surface confronting said body is covered by said shoe to avoid direct contract between said plate base and said tensioner body.

5. A chain tensioner according to claim 4 wherein said shoe has an outer surface opposite to said inner surface adapted to engage the chain, said outer surface having a configuration to maintain said surface in engagement with the chain.

6. A chain tensioner according to claim 3 wherein the plunger has a lower end with a hollow portion extending axially of said plunger and being open at its lower end, said urging means comprising a spring mounted in said hollow portion, and bearing at its upper end against said plunger and bearing at its lower end against said tensioner body.

7. A chain tensioner according to claim 6 wherein said body includes a cylindrical chamber housing the lower end of said plunger and a valve positioned below said plunger and providing unidirectional fluid flow into said chamber and said hollow portion, said plunger being slidably mounted in said body with limited clearance, said limited clearance affording restricted reverse fluid flow out of said hollow portion and out of said chamber.

* * * * *

UNITED STATES PATENT AND TRADEMARK OFFICE
CERTIFICATE OF CORRECTION

PATENT NO. : 5,676,614
DATED : October 14, 1997
INVENTOR(S) : Kozo Inoue; Hiroshi Hashimoto It is certified that error appears in the above-identified patent and that said Letters Patent is hereby corrected as shown below:

On the title page, insert the Assignee as follows:
--[73] Assignee: Tsubakimoto Chain Co.
Osaka-fu, Japan; by said Kozo Inoue and
Hiroshi Hashimoto--

Signed and Sealed this

Ninth Day of June, 1998

Attest:

BRUCE LEHMAN

Attesting Officer

Commissioner of Patents and Trademarks